(12) United States Patent
Scott et al.

(10) Patent No.: US 12,530,186 B2
(45) Date of Patent: Jan. 20, 2026

(54) SMART XCLARITY

(71) Applicant: Lenovo Enterprise Solutions (Singapore) Pte. Ltd., New Tech Park (SG)

(72) Inventors: Tabor Scott, Waldorf, MD (US); Vinay Pandgal Kumaraswamy, Bengaluru (IN); Florin Cazacu, Ilfov (RO); Asmaa El Andaloussi, Asnieres-sur-Seine (FR)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 229 days.

(21) Appl. No.: 18/531,517

(22) Filed: Dec. 6, 2023

(65) Prior Publication Data
US 2025/0190199 A1 Jun. 12, 2025

(51) Int. Cl.
*G06F 8/65* (2018.01)
*G06F 8/61* (2018.01)
(Continued)

(52) U.S. Cl.
CPC ............... *G06F 8/65* (2013.01); *G06F 8/61* (2013.01); *G06F 8/71* (2013.01); *G06F 9/45558* (2013.01); *G06F 2009/45595* (2013.01)

(58) Field of Classification Search
CPC ..... G06F 8/65; G06F 8/61; G06F 8/71; G06F 9/45558; G06F 2009/45595
See application file for complete search history.

(56) References Cited

U.S. PATENT DOCUMENTS 8,495,717 B1 * 7/2013 Beacham ................ G06F 21/62
380/279
9,219,648 B1 12/2015 Chheda et al.
(Continued)

FOREIGN PATENT DOCUMENTS

| CN | 112685260 A | * | 4/2021 | |
| CN | 113495732 A | * | 10/2021 | ......... G06F 9/44505 |
| WO | WO-2007040858 A1 | * | 4/2007 | ........... G06Q 10/087 |

*Primary Examiner* — Phillip H Nguyen
(74) *Attorney, Agent, or Firm* — Kunzler Bean & Adamson; Bruce R. Needham

(57) ABSTRACT

A method includes identifying configuration information of a server being deployed, which includes a configuration and software requirements, and the server is managed by a management server through a management controller controlling a host hosting the server. The method includes retrieving a recommended setup of hardware and software for the server based on the configuration information and retrieving, from a deployment tracking module, a recommended deviation. The method includes creating a deployment file based on the recommended setup and deviation, and transmitting the deployment file to the management controller, which uses the deployment file to configure the server. The deployment tracking module monitors firmware, drivers and/or software deployments of servers for problems and software deployments, monitors websites/databases associated with firmware, drivers and/or software deployed on the servers for updates, analyzes information from monitoring the deployments and updates from the websites/databases, and manages recommended deviations from recommended setups.

20 Claims, 9 Drawing Sheets

(51) Int. Cl.
*G06F 8/71* (2018.01)
*G06F 9/455* (2018.01)

(56) References Cited

U.S. PATENT DOCUMENTS

| | | | |
|---|---|---|---|
| 2003/0005093 A1* | 1/2003 | Deboer | G06F 8/71 709/220 |
| 2003/0005104 A1* | 1/2003 | Deboer | H04L 41/0856 709/222 |
| 2020/0192651 A1* | 6/2020 | Mudumbai | H04L 67/34 |
| 2023/0018854 A1* | 1/2023 | Martin | H04L 63/0435 |

* cited by examiner

SMART XCLARITY

FIELD

The subject matter disclosed herein relates to server deployment and more particularly relates to automating changes to installation parameters for server deployment.

BACKGROUND

Deploying a server is a process of loading firmware, drivers, and software for the server on a computing device. The software includes an operating system and may also include other software applications. Typically, deployment of a server is largely a manual process. Updates to the software, drivers or firmware of the servers also often involve manual testing and installation.

BRIEF SUMMARY

A method for automating changes to installation parameters for server deployment is disclosed. An apparatus and computer program product also perform the functions of the method. The method includes identifying, at a management server, configuration information of a server being deployed. The configuration information includes a configuration and software requirements for the server and the server is managed by the management server through a management controller controlling a host computing device hosting the server. The method includes retrieving a recommended setup of hardware and software for the server based on the configuration information and retrieving, from a deployment tracking module, a recommended deviation to the recommended setup. The method includes creating a deployment file based on the recommended setup and recommended deviation, and transmitting the deployment file to the management controller. The management controller uses the deployment file to configure the server. The deployment tracking module is configured to monitor firmware, drivers and/or software deployments of a plurality of servers and associated configuration information for problems associated with the firmware, drivers and/or software deployments, to monitor websites and/or databases associated with firmware, drivers and/or software deployed on the plurality of servers for updates to the firmware, drivers and/or software, to analyze information from monitoring the firmware, drivers and/or software deployments and updates from the websites and/or databases, and to manage recommended deviations from recommended setups in response to analysis of the information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
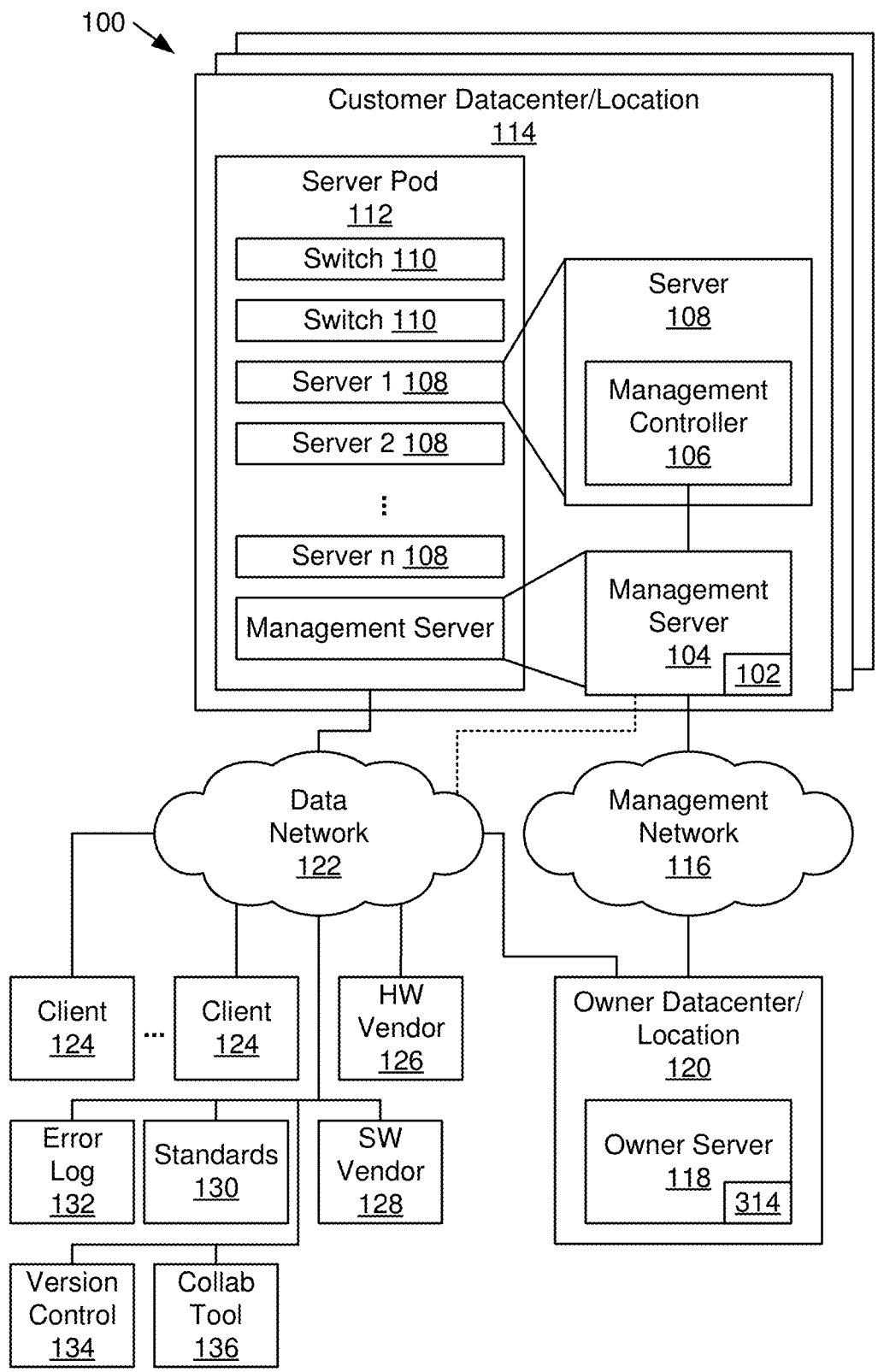
FIG. 1 is a schematic block diagram illustrating a system for automating changes to installation parameters for server deployment, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for automating changes to installation parameters for server deployment is disclosed. An apparatus and computer program product also perform the functions of the method. The method includes identifying, at a management server, configuration information of a server being deployed. The configuration information includes a configuration and software requirements for the server and the server is managed by the management server through a management controller controlling a host computing device hosting the server. The method includes retrieving a recommended setup of hardware and software for the server based on the configuration information and retrieving, from a deployment tracking module, a recommended deviation to the recommended setup. The method includes creating a deployment file based on the recommended setup and recommended deviation, and transmitting the deployment file to the management controller. The management controller uses the deployment file to configure the server. The deployment tracking module is configured to monitor firmware, drivers and/or software deployments of a plurality of servers and associated configuration information for problems associated with the firmware, drivers and/or software deployments, to monitor websites and/or databases associated with firmware, drivers and/or software deployed on the plurality of servers for updates to the firmware, drivers and/or software, to analyze information from monitoring the firmware, drivers and/or software deployments and updates from the websites and/or databases, and to manage recommended deviations from recommended setups in response to analysis of the information.

In some embodiments, the method includes transmitting to a user an approval request for the recommended deviation in response to retrieving the recommended deviation, and transmitting the deployment file is in response to receiving an approval of the approval request. In other embodiments, the method includes, during a training phase, using a machine learning algorithm to analyze the information from the monitoring of the firmware, drivers and/or software deployments and the updates from the websites and/or databases and to create the deployment file. In other embodiments, the method includes, during an operational phase after the training phase and after creation and execution of one or more deployment files, using the machine learning algorithm to analyze additional information from the monitoring of the firmware, drivers and/or software deployments and/or additional updates from the websites and/or databases to create additional deployment files and/or to deactivate deployment files.

In some embodiments, the deployment tracking module managing recommended deviations includes deactivating a recommended deviation in response to one or more problems associated with installation of the recommended deviation and/or creating a recommended deviation in response to a successful deployment of a deviation to a recommended setup on a server. In other embodiments, the deployment tracking module managing recommended deviations includes creating a recommended deviation based on user modifications to a recommended setup. In other embodiments, retrieving the recommended deviation from the deployment tracking module is based on a specific configuration of the server being deployed and/or a specific use case of the software requirements for the server.

In some embodiments, the websites and/or databases associated with firmware, drivers and/or software include a website and/or database of a vendor of hardware and/or software of the recommended setup and/or recommended deviation, a vendor of the plurality of servers, a standards organization governing standards for the host computing device and/or software deployed on the server, an error log, a version control system, and/or a software workspace collaboration tool. In other embodiments, the host computing device includes a hypervisor and the server is on the hypervisor or is a virtual machine hosted by the hypervisor. In other embodiments, the management server is connected to the management controller over a management network. In other embodiments, the deployment file includes an ISO image file.

An apparatus for automating changes to installation parameters for server deployment includes a processor and non-transitory computer readable storage media storing code. The code is executable by the processor to perform operations that include identifying, at a management server, configuration information of a server being deployed. The configuration information includes a configuration and software requirements for the server, and the server is managed by the management server through a management controller controlling a host computing device hosting the server. The operations include retrieving a recommended setup of hardware and software for the server based on the configuration information and retrieving, from a deployment tracking module, a recommended deviation to the recommended setup. The operations include creating a deployment file based on the recommended setup and recommended deviation, and transmitting the deployment file to the management controller. In the embodiments, the management controller uses the deployment file to configure the server. The deployment tracking module is configured to monitor firmware, drivers and/or software deployments of a plurality of servers and associated configuration information for problems associated with the firmware, drivers and/or software deployments, to monitor websites and/or databases associated with firmware, drivers and/or software deployed on the plurality of servers for updates to the firmware, drivers and/or software, to analyze information from monitoring the firmware, drivers and/or software deployments and updates from the websites and/or databases, and to manage recommended deviations from recommended setups in response to analysis of the information.

In some embodiments, the operations include transmitting to a user an approval request for the recommended deviation in response to retrieving the recommended deviation, and transmitting the deployment file is in response to receiving an approval of the approval request. In other embodiments, the operations include, during a training phase, using a machine learning algorithm to analyze the information from the monitoring of the firmware, drivers and/or software deployments and the updates from the websites and/or databases and to create the deployment file. In other embodiments, the operations include, during an operational phase after the training phase and after creation and execution of one or more deployment files, using the machine learning algorithm to analyze additional information from the monitoring of the firmware, drivers and/or software deployments and/or additional updates from the websites and/or databases to create additional deployment files and/or to deactivate deployment files.

In some embodiments, the deployment tracking module managing recommended deviations includes deactivating a recommended deviation in response to one or more problems associated with installation of the recommended deviation, creating a recommended deviation in response to a successful deployment of a deviation to a recommended setup on a server, and/or creating a recommended deviation based on user modifications to a recommended setup. In other embodiments, retrieving the recommended deviation from the deployment tracking module is based on a specific configuration of the server being deployed and/or a specific use case of the software requirements for the server.

In some embodiments, the websites and/or databases associated with firmware, drivers and/or software comprise a website and/or database of a vendor of hardware and/or software of the recommended setup and/or recommended deviation, a vendor of the plurality of servers, a standards organization governing standards for the host computing device and/or software deployed on the server, an error log, a version control system, and/or a software workspace collaboration tool.

A program product for automating changes to installation parameters for server deployment includes a non-transitory computer readable storage medium storing code. The code is configured to be executable by a processor to perform operations that include identifying, at a management server, configuration information of a server being deployed. The configuration information includes a configuration and software requirements for the server, and the server is managed by the management server through a management controller controlling a host computing device hosting the server. The operations include retrieving a recommended setup of hardware and software for the server based on the configuration information and retrieving, from a deployment tracking module, a recommended deviation to the recommended setup. The operations include creating a deployment file based on the recommended setup and recommended deviation, and transmitting the deployment file to the management controller. The management controller uses the deployment file to configure the server. The deployment tracking module is configured to monitor firmware, drivers and/or software deployments of a plurality of servers and associated configuration information for problems associated with the firmware, drivers and/or software deployments, to monitor websites and/or databases associated with firmware, drivers and/or software deployed on the plurality of servers for updates to the firmware, drivers and/or software, to analyze information from monitoring the firmware, drivers and/or software deployments and updates from the websites and/or databases, and to manage recommended deviations from recommended setups in response to analysis of the information.

In some embodiments, the operations further include transmitting to a user an approval request for the recommended deviation in response to retrieving the recommended deviation, and transmitting the deployment file is in response to receiving an approval of the approval request.

FIG. 1 is a schematic block diagram illustrating a system 100 for automating changes to installation parameters for server deployment, according to various embodiments. The system 100 includes a deployment apparatus 102, all or a portion of which may be in a management server 104 and/or in an owner server 118 remote from a customer location 114, which may be a customer datacenter 114. In some embodiments, the owner leases computing equipment to a customer, which is located at the customer datacenter 114. The system 100 includes one or more servers 108a-n (generically or collectively "108") in a server pod 112 at a customer datacenter 114 or other customer facility ("on-premises site"). A server 108 is a computing device that may be rack-mounted or may be free-standing and is often referred to as a "server." The server 108 may be configured with a hypervisor that hosts virtual machines ("VMs").

The servers 108, in some embodiments, are remote from an owner's facility ("off-premises site") where the owner (lessor), in some embodiments, owns the servers 108 and leases the servers 108 to a customer (lessee). In some examples, the servers 108 are at an edge computing location. In some embodiments, the owner maintains the servers 108 and bills the customer based on usage of the servers 108. In other embodiments, the customer buys the servers 108, switches 110, etc. from the owner but the owner services the servers 108 and other equipment at the customer datacenter 114. In some embodiments, the servers 108 include a management controller 106 in communication with a management server 104 that is physically located with the servers 108 or connected via a public data network 122. The server pod 112, in some embodiments, includes switches 110 and/or other computing devices and may be mounted in one or more racks. The server pod 112 may also include power supplies (not shown), data storage devices (not shown), and other equipment known to those of skill in the art.

In some embodiments, the server pod 112 includes a management server 104 which controls various aspects of the servers 108 via a management controller 106 located in a server 108. In some examples, the management server 104 is a rack-mounted server. In other embodiments, the management server 104 is a web-based server connected over a management network 116 or over a data network 122 via a secure connection, such as a tunnel or virtual private network.

The management controller 106, in some embodiments, is referred to as a baseboard management controller ("BMC"). In other embodiments, the management controller 106 is an Xclarity® controller ("XCC") by Lenovo® or a controller with similar functionality. In some embodiments, the management controller 106 monitors internal physical variables in the servers 108, such as temperature, humidity, power supply voltage, fan speeds, communication parameters, operating system ("OS") functions, and the like and communicates measurements and other data to the management server 104. Typically, the servers 108 each include a management controller 106. In some embodiments, the management controller 106 measures and stores power consumption data, utilization data, operational data and other metering data of the server 108.

In other examples, the management server 104, through the management controller 106, deploys instructions, software, firmware, etc. to deploy a virtual machine ("VM") managed by the hypervisor in the server 108. In some embodiments, instructions, software, firmware, etc. from the management server 104 may allocate server resources to the VM, may initiate an OS instance in the VM, etc. One of skill in the art will recognize other ways that a management server 104 functions with respect to the servers 108. In some examples, the management server 104 is an Xclarity® Administrator ("XCA") that manages several servers 108 and associated management controllers 106.

In some embodiments, the management server 104 communicates with the management controllers 106 via a management network 116. In some embodiments, the management server 104 communicates with the owner server 118 at an owner datacenter/location 120 over a management network 116. In some embodiments, the management network 116 is separate from a data network 122 connecting the servers 108 with clients 124. Typically, the data network 122 carries much more data than the management network 116 and has a bandwidth capable of handling data traffic between the clients 124 and customer datacenter 114.

In some embodiments, the management network 116 is secure and includes a firewall capable of limiting external traffic to communication with a system administrator over the owner server 118. In other embodiments, the owner server 118 communicates with the management server 104 over the data network 122 using secure communications, such as over a tunnel, a virtual private network ("VPN"), etc.

In some embodiments, the management network 116 includes local area network ("LAN"), a wide area network ("WAN"), a fiber network, a wireless connection, a cellular network, etc. and may also include a combination of network types. In some embodiments, the data network 122 is local area network ("LAN"), a wide area network ("WAN"), a fiber network, a wireless connection, a cellular network, the Internet, etc. and may also include a combination of network types. The management network 116 and the data network 122 include data cables, servers, switches, routers, and/or other networking equipment.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In some embodiments, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The deployment apparatus 102 provides a way to deploy a server when there is a deviation from a recommended setup. One of the typical functions of a management controller 106 is to provide a deployment file for the deployment of a server. In some embodiments, deployment of a server is for initial setup of a bare metal computing device where the management controller 106 executes one or more deployment files to install firmware, drivers, an operating system ("OS"), software applications, and the like on the server 108. In some embodiments, the deployment files are for setting up a server in the form of a hypervisor on the server 108. In other embodiments, the management controller 106 provides one or more deployment files for deploying a server in the form of a virtual machine ("VM") on the hypervisor of a server 108.

In some embodiments, the deployment files are by way of an ISO image file and the management controller 106 receives the ISO image file from the management server 104. In other embodiments, the deployment files are other types of files rather than an ISO image file. The management server 104, in some embodiments, controls which deployment file(s) are distributed to a server 108 based on configuration information of the server being deployed. The configuration information includes hardware configuration information, software requirements, etc. Typically, the deployment files are customized for the configuration information of the server being deployed. The deployment files may include firmware, drivers, an OS, software applications, etc.

The deployment apparatus 102 is configured to identify configuration information of a server to be deployed where the server is managed by the management server 104 through a management controller 106 controlling a host computing device (e.g. server 108) hosting the server being deployed. The deployment apparatus 102 is configured to retrieve a recommended setup of hardware and software for the server based on the configuration information of the server. The recommended setup includes which drivers, which firmware, which OS version, a configuration of software applications, etc. to be deployed on the server based on a "best recipe" for the particular configuration information of the server.

The deployment apparatus 102 is also configured to retrieve, from the deployment tracking module, retrieve a recommended deviation to the recommended setup and configured to create a deployment file for the server being deployed. The deployment apparatus 102 is also configured to transmit the deployment file to the management controller 106. The management controller 106 is configured to execute the deployment file to configure the server being deployed. In some embodiments, the deployment apparatus 102 is configured, in response to receiving a recommended deviation, to ask a system administrator or other user for permission to include the recommended deviation and the deployment apparatus 102 creates the deployment file in response to receiving approval from the system administrator or user. The deployment apparatus 102 is discussed in more detail with regards to the apparatus 300 of FIG. 3.

The deployment tracking module monitors servers that have been deployed along with the specific configuration information of the server and what firmware, software, updates, patches, etc. have been installed on the server. The deployment tracking module also monitors vendor websites, databases, etc. of vendors of hardware, vendors of software, error logs, etc. The deployment tracking module, in some embodiments, also monitors websites associated with applicable standards, version control systems, software workspace collaboration tools, etc.

The deployment tracking module analyzes the monitored information and manages deviations from recommended setups. In some embodiments, the deployment tracking module creates recommended deviations and/or deactivates recommended deviations after determining there are problems with deployments using the recommended deviations. In some embodiments, the deployment tracking module accesses websites or databases of hardware vendors 126, software vendors 128, standards organizations 130, error logs 132, software workspace collaboration tools 136, and/or version control locations 134 over the data network 122 and/or the management network 116. The deployment tracking module is discussed in more detail with regards to the apparatuses 400, 500 of FIGS. 4 and 5.

Figure 2:
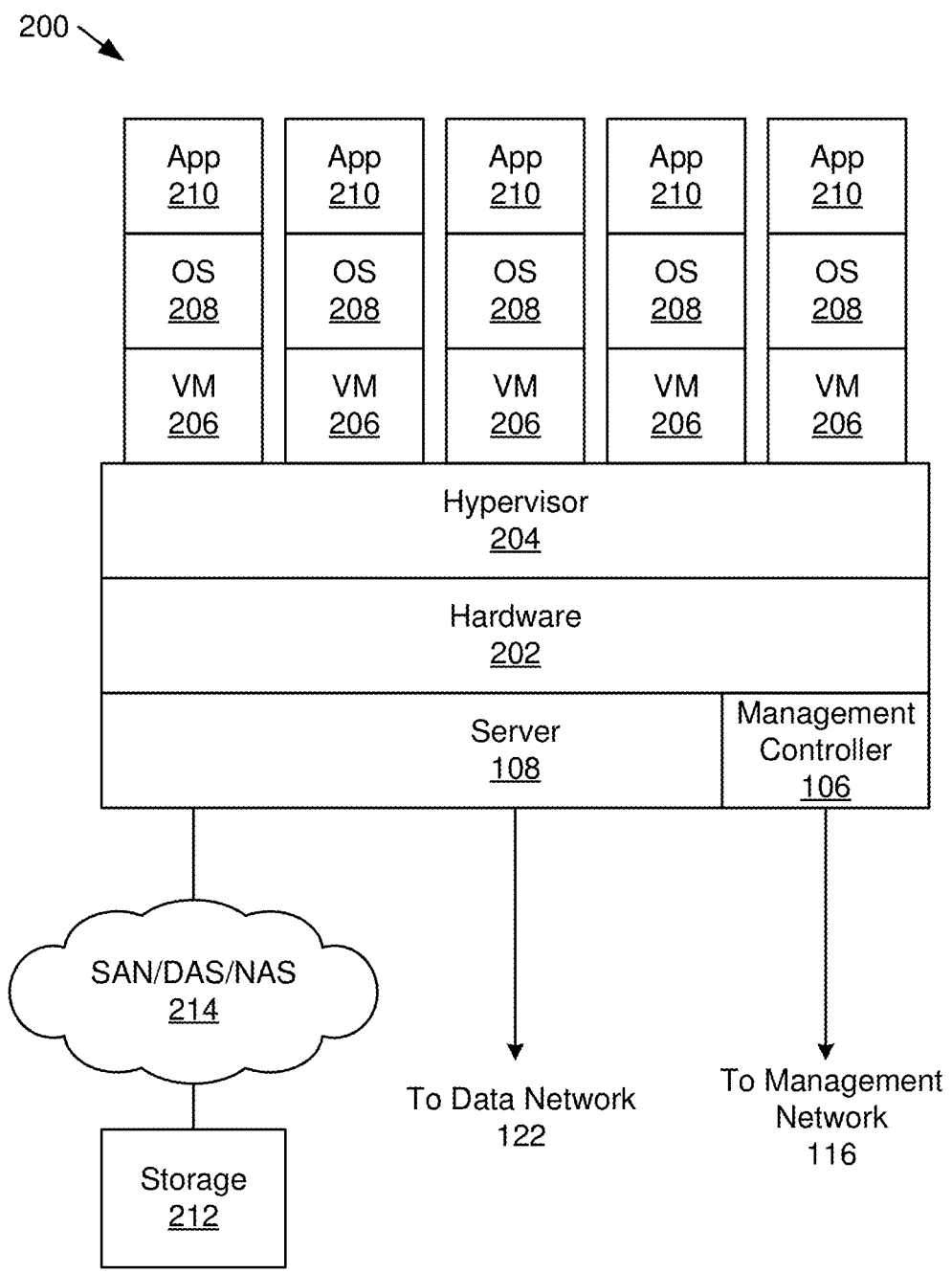
FIG. 2 is a schematic block diagram illustrating a server with a hypervisor and virtual machines, according to various embodiments.

FIG. 2 is a schematic block diagram 200 illustrating a server 108 with a hypervisor 204 and virtual machines 206, according to various embodiments. One or more of the servers 108, in some embodiments, are configured to host virtual machines. The servers 108 include hardware 202 with a hypervisor 204 running on the hardware 202. Virtual machines 206 are then deployed on the servers 108 through the hypervisor 204, which manages data traffic between the virtual machines and clients 124 and handles other management tasks of the virtual machines 206. Each virtual machine 206 typically runs a separate instance of an OS 208 and the OS 208 executes one or more applications 210 on the virtual machine 206. In other embodiments, the hypervisor 204 hosts one or more containers that include one or more applications 210.

In some embodiments, the management controller 106 of a server 108 executes a deployment file to deploy a virtual machine 206. In other embodiments, the management controller 106 of the server 108 executes a deployment file to deploy the hypervisor 204 when the server 108 is first set up or for an update. The server 108 is depicted with a Type I hypervisor 204, which runs on bare metal (e.g., hardware 202). The embodiments described herein are also applicable to a Type II hypervisor 204, which runs on an operating system (not shown) running on the hardware 202 of the server 108.

In some embodiments, the server 108 includes a data storage device (not shown), such as a hard disk drive, solid-state storage, etc. Typically, the server 108 also has access to data storage 212 through a storage area network ("SAN") 214, or similar network, such as direct attached storage ("DAS") 214, network attached storage ("NAS") 214, or the like. The server 108 may access clients 124 over the data network 122 through a switch 110.

Figure 3:
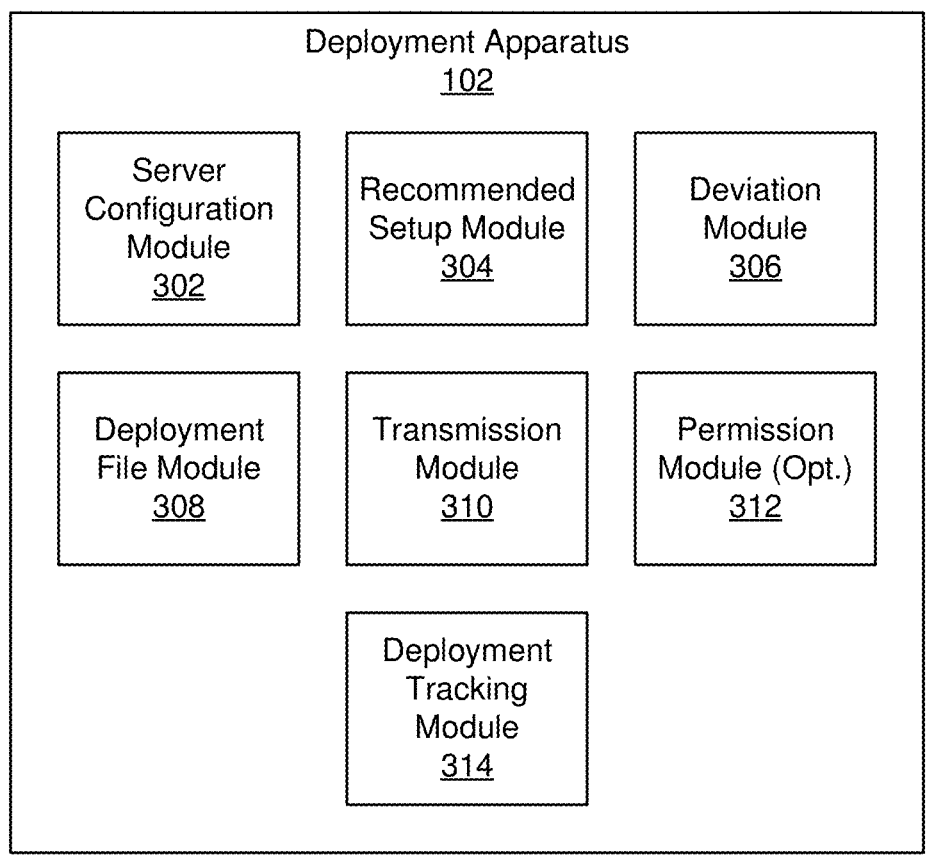
FIG. 3 is a schematic block diagram illustrating an apparatus for automating changes to installation parameters for server deployment, according to various embodiments.

FIG. 3 is a schematic block diagram illustrating an apparatus 300 for automating changes to installation parameters for server deployment, according to various embodiments. The apparatus 300 includes a deployment apparatus 102 with a server configuration module 302, a recommended setup module 304, a deviation module 306, a deployment file module 308, and a transmission module 310, and optionally a permission module 312 and/or a deployment tracking module 314, which are described below. In various embodiments, the apparatus 300 is implemented using code stored on computer readable storage media. In other embodiments, the apparatus 300 is at least partially implemented using a programmable hardware device and/or hardware circuits.

The apparatus 300 includes a server configuration module 302 configured to identify, at the management server 104, configuration information of a server being deployed. The configuration information includes a configuration and software requirements for the server. The server is managed by the management server 104 through a management controller 106 controlling a host computing device (e.g., server 108) hosting the server being deployed. The servers 108 of the system 100 of FIG. 1 act as host computing devices when the deployment apparatus 102 is deploying a server, such as a hypervisor 204 or a virtual machine 206.

The configuration information typically includes information about the hardware 202 where the server will be deployed, such as processor information, memory information, memory type, graphics processing unit ("GPU") information, and the like. The configuration information typically also includes information and/or requirements for an operating system to run on the server being deployed. The configuration information may also include information about an operating system running on the host computing device 108. The configuration information, in some embodiments, includes information about one or more software applications to be installed on the server being deployed. The software information, in some embodiments, includes software parameters, requirements, licensing information, and the like. The configuration information includes any information relevant to deploying the server.

The apparatus 300 includes a recommended setup module 304 configured to retrieve a recommended setup of hardware and software for the server being deployed based on the configuration information for the server being deployed. In some embodiments, the recommended setup module 304 retrieves the recommended setup from a database, website or other source that has setup information and/or files for various server configurations, models, types, etc. In some embodiments, the recommended setup module 304 retrieves the recommended setup from the owner server 118 or other location controlled by the owner, vendor, manufacturer, etc. of the server 108.

The recommended setup, in some embodiments, is a known best installation for the server being deployed based on the configuration information. The recommended setup, in various embodiments, includes current versions of firmware, drivers, software, etc. and/or associated parameters for initial provisioning of hardware 202 of the host computing device (server 108). In some embodiments, the recommended setup includes a particular version of an operating system, parameters for the operating system, etc. for the server 108, which may be a known stable version of the operating system for the particular hardware 202 where the operating system will run. In other embodiments, the recommended setup includes current versions of applications, links to applications, software parameters, settings, etc. for the server being deployed. In some embodiments, the recommended setup includes information necessary to create an ISO image file based on a best recipe, approved setup, etc. The ISO image file, in some embodiments, is a deployment file capable of being copied to the management controller 106 that may be a complete or nearly complete copy of what needs to be installed for the server being deployed. One of skill in the art will recognize other sources for a recommended setup and/or other information, files, etc. for the recommended setup.

The apparatus 300 includes a deviation module 306 configured to retrieve, from a deployment tracking module 314, a recommended deviation to the recommended setup. The deviation is some type of a change from the recommended setup. In some examples, the recommended deviation is an update to software, firmware, a driver, etc. In some embodiments, the recommended deviation has been determined by the deployment tracking module 314 to be acceptable in some way, such as having been previously successfully installed, showing a low probability of failure, or the like. Discussion of recommended deviations and the deployment tracking module 314 is included with the description of the deployment tracking module 314.

The recommended deviation, in some embodiments, is the basis for a change to the recommended setup. In some embodiments, the recommended deviation is a change to a single application, firmware version, driver version, etc. In other embodiments, the recommended deviation is a change to two or more applications, firmware versions, etc. In other embodiments, the recommended deviation changes the way an ISO image is created. One of skill in the art will recognize other recommended deviations and how the recommended deviations affect a recommended setup.

The apparatus 300 includes a deployment file module 308 configured to create a deployment file for the server 108. The deployment file is intended to be used by a management controller 106 to provision the server 108, whether the server is the hypervisor 204, a virtual machine 206 hosted by the hypervisor 204, etc. Provisioning the server 108, as used herein, includes installing firmware, drivers and/or software, setting controls, parameters, passwords, etc., accessing licenses, or any other activity known by those of skill in the art associated with getting a server 108 ready for use based on the configuration information of the server 108, the environment of the server 108, user preferences, etc.

In some embodiments, the deployment file module 308 creates the deployment file by creating an ISO image file. An ISO image file is typically a file created on an optical disk, such as a compact disc ("CD") digital video disc ("DVD"), or the like. In some embodiments, the ISO image file (also called an ISO image or ISO file) is a complete copy of firmware, operating system, software, etc. in a form ready for use. In some embodiments, the ISO image file is a sector-by-sector copy of files on an optical disc. In some embodiments, the ISO image file does not include compression. In some embodiments, the ISO image file is a copy of files of the recommended setup along with the recommended deviation in a form that may be used by the server 108 once the ISO image file is copied to the server 108.

In other embodiments, the deployment file module 308 creates the deployment file by accessing the firmware files, drivers, operating system files, software application files, etc. and includes a plurality of deployment files. A deployment file, as used herein is a file that is to be copied to the server 108 for use in setup of the server 108. In some embodiments, a deployment file is a final version of firmware, a driver, or software to be used by the server being deployed. In other embodiments, the deployment file is an executable file that operates to further setup up the server being deployed. In some embodiments, the deployment file module 308 creating a deployment file includes the deployment file module 308 creating a plurality of deployment files for transfer to the server 108.

In some embodiments, the deployment file module 308 creates a deployment file by assembling, downloading, retrieving, etc. one or more preexisting files. In some embodiments, the deployment file module 308 creates a deployment file by organizing one or more files. In some embodiments, the deployment file module 308 creates a deployment file by creating a link to a location of a deployment file where the link is copied to the server 108 and the server 108 and/or the management controller 106 of the server 108 uses the link to access the deployment file from a software vendor, file repository, etc. One of skill in the art will recognize other ways for the deployment file module 308 to create a deployment file for the server 108.

The apparatus 300 includes a transmission module 310 configured to transmit the deployment file to the management controller 106. The management controller 106 uses the deployment file to configure the server being deployed. In some embodiments, the transmission module 310 transmits the deployment file in response to the deployment module 308 creating the deployment file. In some embodiments, the transmission module 310 transmits the deployment file directly to the management controller 106, such as to a non-volatile data storage device on the hardware 202 of the server 108 and accessible to the server 108. In other embodiments, the transmission module 310 transmits the deployment file by providing a location of the deployment file to the management controller 106 and the management controller 106 then accesses the location to download the deployment file. One of skill in the art will recognize other ways for the transmission module 310 to transmit the deployment file.

Optionally, the apparatus 300 includes a permission module 312 configured to transmit to a user an approval request for the recommended deviation in response to retrieving the recommended deviation where transmitting the deployment file is in response to receiving an approval of the approval request. Where the permission module 312 is implemented, the permission module 312 transmits the approval request for the recommended deviation via direct message, a popup on a user interface, an email or other transmission method known to those of skill in the art to notify the user of the approval request for the recommended deviation. The user, in some embodiments, is a system administrator. The deployment file module 308 then creates the deployment file(s) after receiving approval of the recommended deviation. In some embodiments, the deployment file module 308 creates the deployment file(s) without the recommended deviation if the user does not approve of the recommended deviation.

In some embodiments, the permission module 312 transmits an approval request with multiple parts or transmits multiple approval requests where the recommended deviation includes more than one change or deviation to the recommended setup. In the embodiments, the user may then approve or reject each of the parts or requests and the deployment file module 308 includes approved recommended deviations and does not include rejected recommended deviations when creating the deployment file(s).

Figure 4:
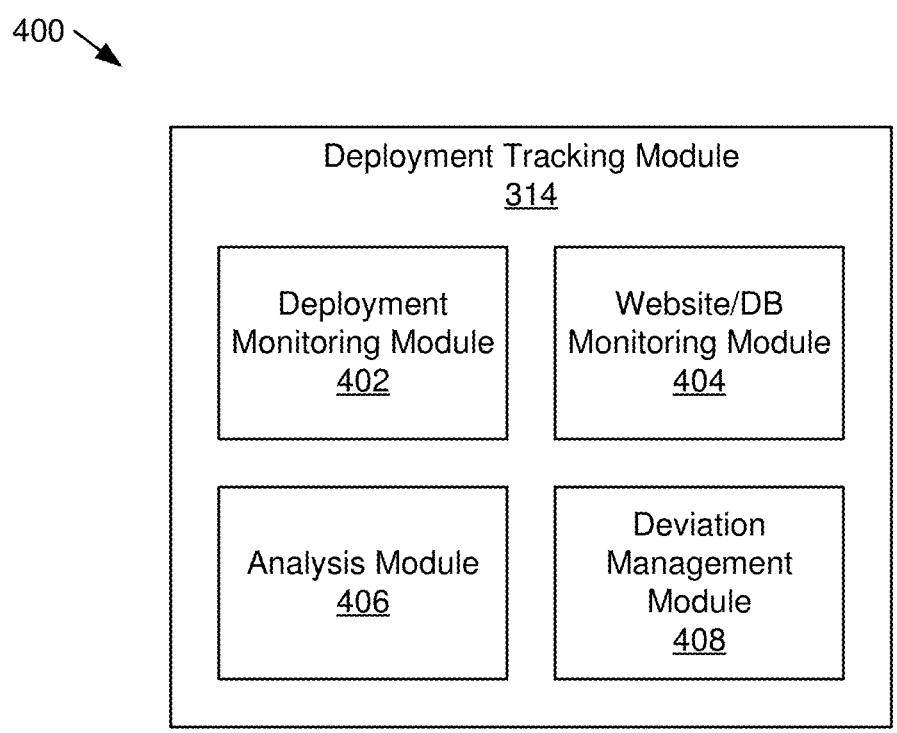
FIG. 4 is a schematic block diagram illustrating a deployment tracking module for automating changes to installation parameters for server deployment, according to various embodiments.

In some embodiments, the apparatus 300 includes at least a portion of the deployment tracking module 314. FIG. 4 is a schematic block diagram illustrating a deployment tracking module 314 for automating changes to installation parameters for server deployment, according to various embodiments. The deployment tracking module 314 includes a deployment monitoring module 402, a website/database monitoring module 404, an analysis module 406, and/or a deviation management module 408, which are described below.

In some embodiments, a portion of the deployment tracking module 314 is implemented on the management server 104 and a portion of the deployment tracking module 314 is implemented elsewhere, such as on the owner server 118 or other location accessible to the management server 104 and/or owner server 118. In some embodiments, the deployment tracking module 314 is implemented external to the management server 104 and the management server 104 retrieves and/or receives recommended deviations from the deployment tracking module 314.

In some embodiments, the deployment tracking module 314 is accessible to the management server 104 and is located at the owner location 120, on the owner server 118, on a separate server accessible to the to owner server 118 and/or management server 104, etc. In other embodiments, a portion of the deployment tracking module 314 is on the management server 104. The portion, in some embodiments, is an application programming interface ("API") or similar interface that accesses the deployment tracking module 314. One of skill in the art will recognize other ways for the management server 104 to access the deployment tracking module 314.

A purpose of the deployment tracking module 314 is to automate tracking of deployments of software, firmware, etc. along with deviations from a recommended setup using machine learning in order to automatically create recommended deviations. In some embodiments, the deployment tracking module 314 provides a way to test updates without the complicated manual procedures currently used.

In some embodiments, the deployment tracking module 314 includes a deployment monitoring module 402 configured to monitor firmware, drivers and/or software deployments of a plurality of servers and associated configuration information for problems associated with the firmware, drivers and/or software deployments. In the embodiments, the deployment monitoring module 402 keeps track of configuration information of the servers, firmware, drivers, an OS, software, etc. installed on the servers, and then keeps track of performance of the servers and any problems, errors, failures, etc. of the servers to be able to better determine where deviations from a recommended setup is present and then whether or not the deviations resulted in any problems.

In some embodiments, the deployment tracking module 314 includes a website/database monitoring module 404 configured to monitor websites and/or databases associated with firmware, drivers and/or software deployed on the plurality of servers for updates to the firmware, drivers and/or software. In the embodiments, the website/database monitoring module 404 is able to determine if an update is available for firmware, software, etc. In some embodiments, an update is the basis of a recommended deviation. In some embodiments, the website/database monitoring module 404 and/or the deployment tracking module 314 use the availability of an update as an affirmation of viability of the update. In other embodiments, the website/database monitoring module 404 and/or the deployment tracking module 314 seek information about testing, problems, etc. associated with the update to determine if the update should be a recommended deviation. In other embodiments, the website/database monitoring module 404 and/or the deployment tracking module 314 seek information about where the updates have been successfully installed to help determine if the update should be a recommended deviation.

In some embodiments, the websites and/or databases associated with firmware, drivers, and software include other locations, such as a vendor of the hardware 202 and/or software of the recommended setup and/or recommended deviation. In other embodiments, the websites and/or databases associated with firmware, drivers, and software include a vendor of computing devices hosting the plurality of servers. In other embodiments, the websites and/or databases associated with firmware, drivers, and software include a standards organization governing the host computing device standards and/or software standards. For example, a change in a standard may result in a deviation to a recommended setup. In other embodiments, the websites and/or databases associated with firmware, drivers, and software include an error log, a version control system, and/or a software workspace collaboration tool. Other websites and/or databases may also be accessed by the website/database monitoring module 404.

The deployment tracking module 314 includes an analysis module 406 configured to analyze information from monitoring the firmware, drivers and/or software deployments and updates from the websites and/or databases and a deviation management module 408 configured to manage recommended deviations from recommended setups in response to analysis of the information. The analysis module 406, in various embodiments, uses data from any deployment of a server, configuration information of the server, problems with deployments, etc. The analysis module 406, in various embodiments, also uses other website and database information collected and monitored by the website/database monitoring module 404 for analysis. From the analysis, the deviation management module 408 then manages recommended deviations.

In some embodiments, the deviation management module 408 managing recommended deviations includes deactivating a recommended deviation in response to one or more problems associated with installation of the recommended deviation and/or creating a recommended deviation in response to a successful deployment of a deviation to a recommended setup on a server. In other embodiments, a user may make user modifications to a server recommended setup either prior to deployment or after deployment, which effectively creates a deviation that may then be monitored by the deployment monitoring module 402. In the embodiments, the deviation management module 408 managing recommended deviations may include creating a recommended deviation based on the user modifications to a recommended setup. For example, where the user modifications result in acceptable operation of the server, the deployment monitoring module 402 may then monitor the server with the user modifications and the analysis module 406 may then recognize the acceptable operation and the deviation management module 408 may create a recommended deviation based on the user modifications.

In some embodiments, the deviation management module 408 creates recommended deviations for servers that have like specifications, requirements, etc. For example, a first recommended deviation may apply to a small subset of servers while a second recommended deviation may apply to different servers with different configurations. In some embodiments, two or more recommended deviations apply to a particular server 108 and are retrieved by the deviation module 306.

Figure 5:
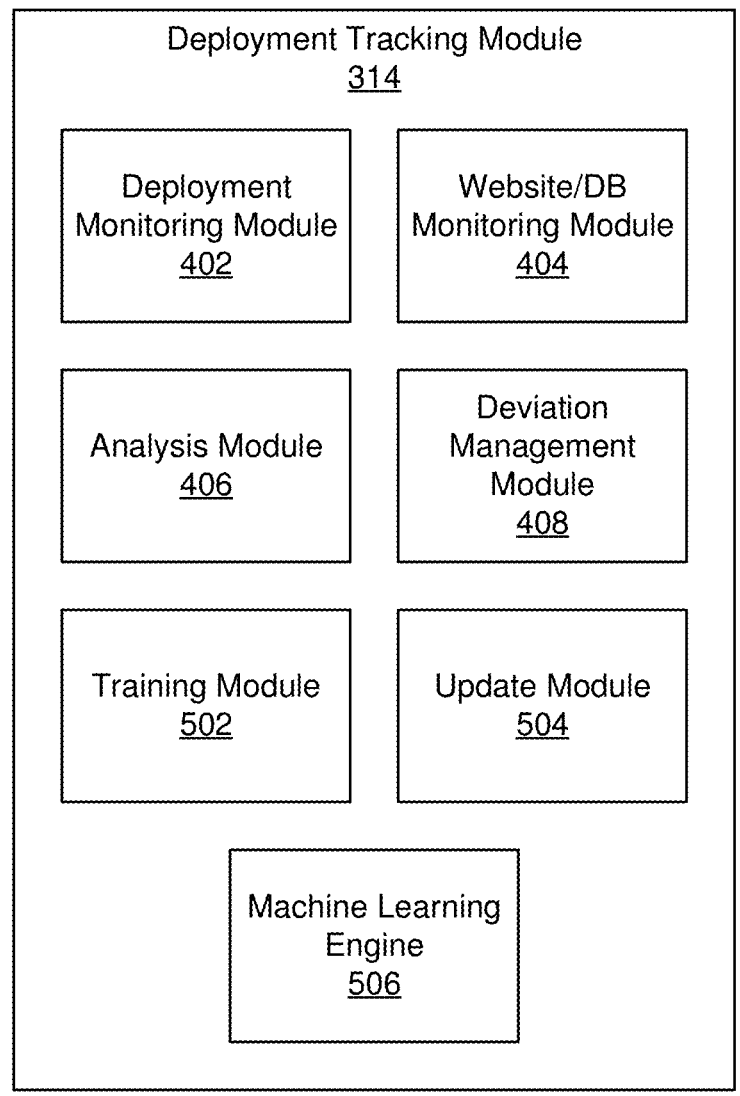
FIG. 5 is a schematic block diagram illustrating another deployment tracking module for automating changes to installation parameters for server deployment, according to various embodiments.

FIG. 5 is a schematic block diagram illustrating another deployment tracking module 314 for automating changes to installation parameters for server deployment, according to various embodiments. The deployment tracking module 314 includes a deployment monitoring module 402, a website/database monitoring module 404, an analysis module 406, and a deviation management module 408 which are substantially similar to those described above in relation to the deployment tracking module 314 of FIG. 4. The deployment tracking module 314 of FIG. 5, in various embodiments, includes a training module 502, an update module 504, and/or a machine learning engine 506, which are described below.

Machine learning is a branch of artificial intelligence and computer science and focuses on using data and algorithms to gradually improve accuracy of results in a similar way as humans learn. By using statistical methods, machine learning algorithms are trained to create classifications and/or predictions to come up with insights that improve results over time. In various embodiments, the deployment tracking module 314 makes use of one or more machine learning algorithms in a machine learning engine 506 focused on recommended deviations from recommended setups of servers. In some embodiments, the machine learning algorithms are integrated with the deployment monitoring module 402, the website/database monitoring module 404, the analysis module 406, the deviation management module 408, the training module 502, and/or the update module 504. Firmware, drivers, software, etc. monitored by the deployment monitoring module 402 along with websites, databases, etc. associated with the firmware, drivers, and software deployed on the servers are used as input to the machine learning algorithms of the machine learning engine 506 during a training phase of the training module 502 and an execution phase of the update module 504.

In some embodiments, the deployment tracking module 314 includes a training module 502, during a training phase, that is configured to use a machine learning algorithm of the machine learning engine 506 to analyze the information from the monitoring of the firmware, drivers and/or software deployments by the deployment monitoring module 402 and the updates from the websites and/or databases from the website/database monitoring module 404 to analyze the monitored data and to create the deployment file. During the training phase, in some embodiments, the training module 502 creates recommended deviations, fine tunes applicability of recommended deviations, monitors deployments with recommended deviations, etc., using the machine learning algorithms of the machine learning engine 506.

In some embodiments, the deployment tracking module 314 includes an update module 504 that, during an operational phase after the training phase and after creation and execution of one or more deployment files, is configured to use the machine learning algorithm to analyze additional information from the monitoring of the firmware, drivers and/or software deployments and/or additional updates from the websites and/or databases to create additional deployment files and/or to deactivate deployment files. The operational phase, in some embodiments, occurs once the deployment tracking module 314 is in use to provide recommended deviations. During the operational phase, the deployment tracking module 314 uses information from new server deployments, additional data about updates, etc. to continually manage recommended deviations.

In some embodiments, the machine learning engine 506 uses classical machine learning and labeled datasets during supervised learning to inform the machine learning algorithms of the deployment tracking module 314. In other embodiments, the machine learning engine 506 uses artificial neural networks ("ANNs") and/or deep learning to use datasets that are not labeled to automatically determine a set of features which distinguish different categories of data from one another and eliminates some human intervention. The ANNs, in some embodiments, include node layers with an input layer, one or more hidden layers, and an output layer. In some embodiments, the input layer of the ANN of the machine learning engine 506 includes input from the deployment monitoring module 402, the website/database monitoring module 404, and/or other applicable data sources. The hidden layers, in some embodiments, are part of the analysis module 406 and the output layer is part of the deviation management module 408. In some embodiments, the hidden layers are deep learning and are two or more layers deep.

Beneficially, the deployment tracking module 314 provides a way to eliminate many manual tasks currently involved in server deployment as well as firmware, driver, and software updates. Monitoring server deployments, associated configuration information, and successes and failures of the deployments provides input not previously available for updates to firmware, drivers and/or software. Manual deviations to a server 108 and subsequent monitoring also provide valuable information for subsequent recommended deviations.

Figure 6:
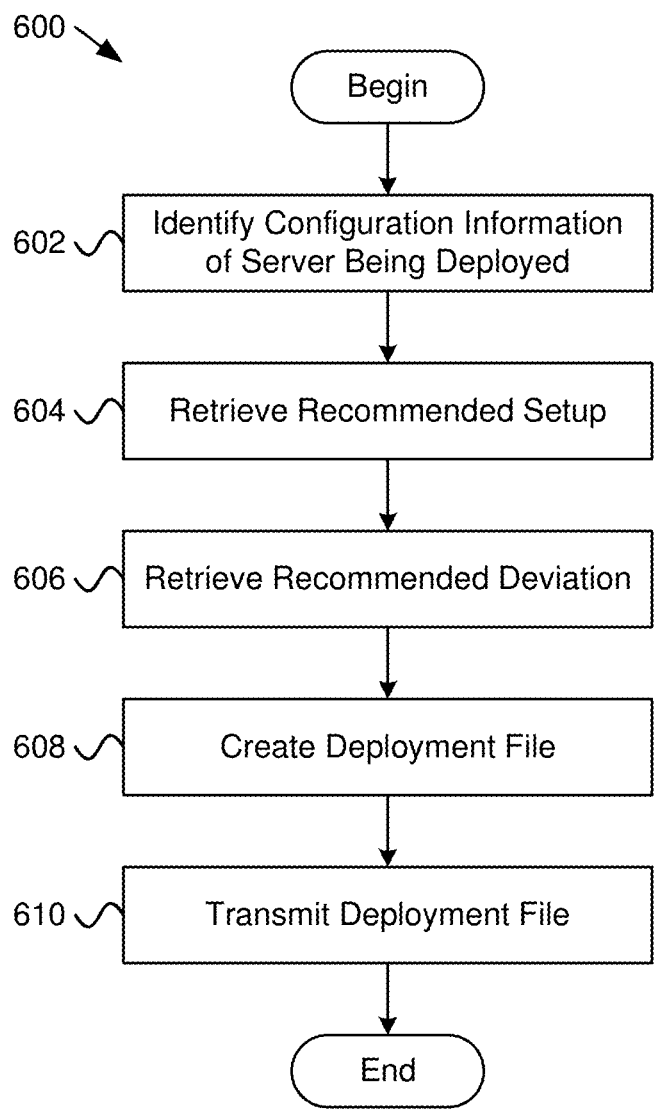
FIG. 6 is a schematic flow chart diagram illustrating a method for automating changes to installation parameters for server deployment, according to various embodiments.

FIG. 6 is a schematic flow chart diagram illustrating a method 600 for automating changes to installation parameters for server deployment, according to various embodiments. The method 600 begins and identifies 602, at a management server 104, configuration information of a server being deployed. The configuration information includes a configuration and software requirements for the server being deployed. The server being deployed is managed by the management server 104 through a management controller 106 controlling a host computing device (e.g., server 108) hosting the server. The server being deployed, in some embodiments, is a hypervisor 204 that is being deployed on hardware 202 of the server 108 controlled by the management controller 106. In other embodiments, the server being deployed is a virtual machine 206 hosted by the hypervisor 204 and includes an operating system 208 and one or more applications 210.

The method 600 retrieves 604 a recommended setup of hardware and software for the server being deployed based on the configuration information and retrieves 606, from a deployment tracking module 314, a recommended deviation to the recommended setup. The method 600 creates 608 a deployment file based on the recommended setup and recommended deviation, and transmits 610 the deployment file to the management controller 106, and the method 600 ends. The management controller 106 then uses the deployment file to configure the server. The management controller 106 uses the deployment file, in various embodiments, by storing data, executing code, and/or other activities associated with deployment of the server. In various embodiments, all or a portion of the method 600 is implemented using the server configuration module 302, the recommended setup module 304, the deviation module 306, the deployment file module 308, the transmission module 310, and the deployment tracking module 314.

Figure 7:
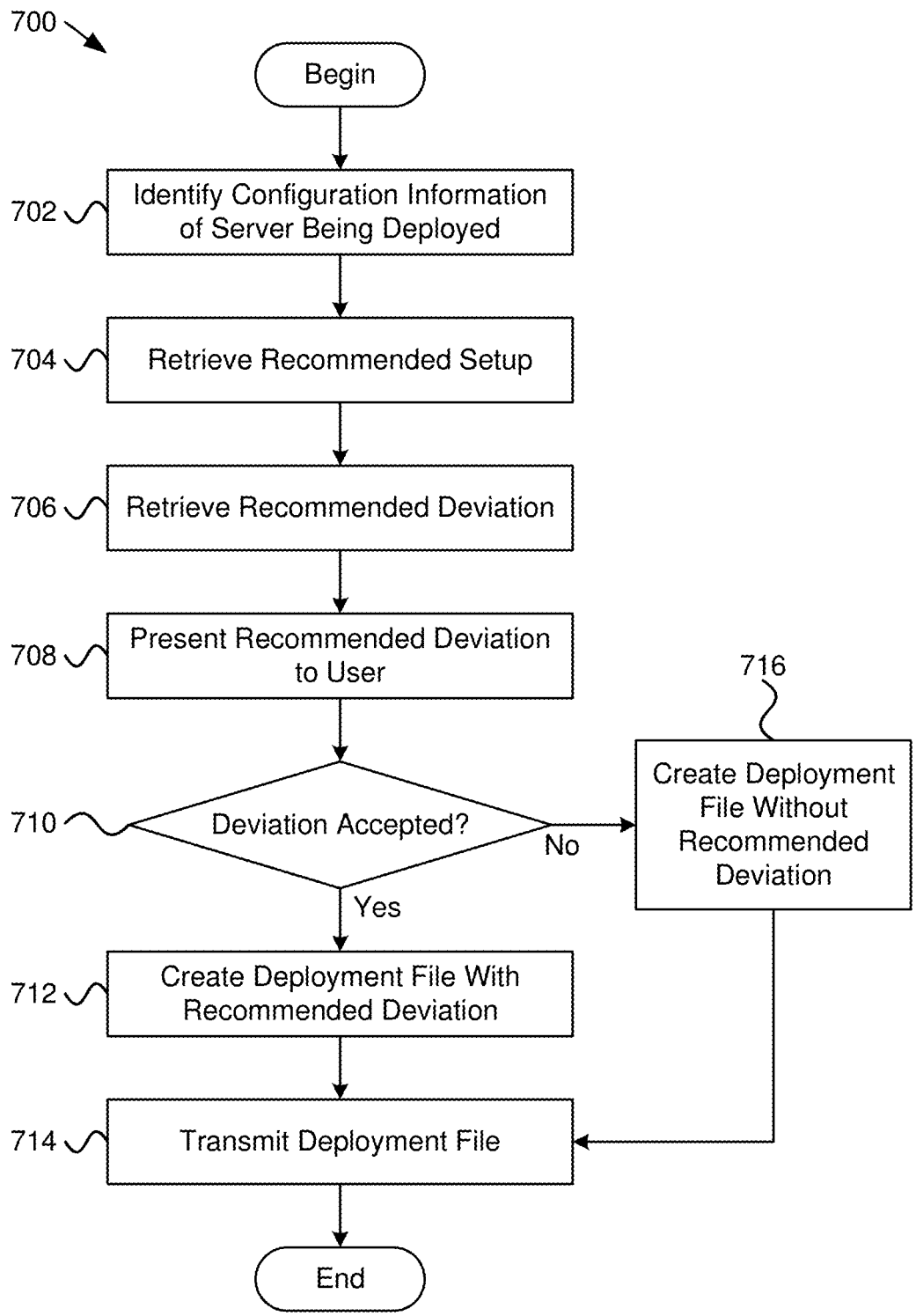
FIG. 7 is a schematic flow chart diagram illustrating another method for automating changes to installation parameters for server deployment, according to various embodiments.

FIG. 7 is a schematic flow chart diagram illustrating another method 700 for automating changes to installation parameters for server deployment, according to various embodiments. The method 700 begins and identifies 702, at a management server 104, configuration information of a server being deployed. The configuration information includes a configuration and software requirements for the server. The server is managed by the management server 104 through a management controller 106 controlling a host computing device (e.g., server 108) hosting the server. The server being deployed, in some embodiments, is a hypervisor 204 that is being deployed on hardware 202 of the server 108 controlled by the management controller 106. In other embodiments, the server being deployed is a virtual machine 206 hosted by the hypervisor 204 and includes an OS 208 and applications 210.

The method 700 retrieves 704 a recommended setup of hardware and software for the server based on the configuration information and retrieves 706, from a deployment tracking module 314, a recommended deviation to the recommended setup. The method 700 presents 708 the recommended deviation to a user and determines 710 if the recommended deviation is accepted. If the method 700 determines 710 that the recommended deviation is accepted, the method 700 creates 712 a deployment file based on the recommended setup and recommended deviation, and transmits 714 the deployment file to the management controller 106, and the method 700 ends. If the method 700 determines 710 that the recommended deviation is not accepted, the method 700 creates 716 the deployment file based on the recommended setup and without the recommended deviation, transmits 714 the deployment file to the management controller 106, and the method 700 ends. The management controller 106 then uses the deployment file to configure the server. In various embodiments, all or a portion of the method 700 is implemented using the server configuration module 302, the recommended setup module 304, the deviation module 306, the deployment file module 308, the transmission module 310, the permission module 312, and the deployment tracking module 314.

Figure 8:
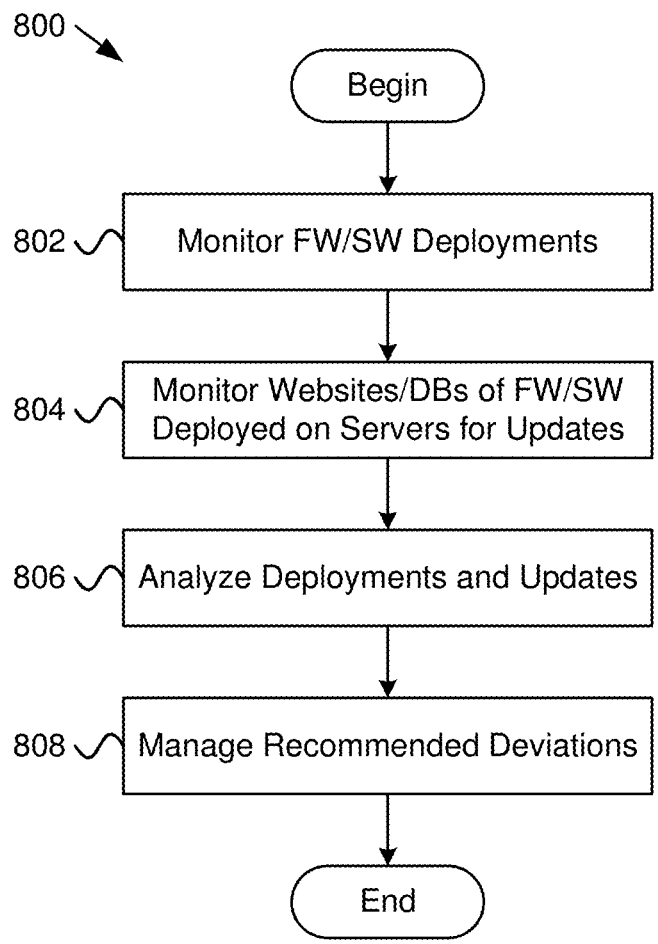
FIG. 8 is a schematic flow chart diagram illustrating a method for managing recommended deviations to a recommended setup, according to various embodiments.

FIG. 8 is a schematic flow chart diagram illustrating a method 800 for managing recommended deviations to a recommended setup, according to various embodiments. The method 800 begins and monitors 802 firmware, drivers and/or software deployments of a plurality of servers and associated configuration information for problems associated with the firmware, drivers and/or software deployments. In some embodiments, the method 800 uses vendor access to servers at data centers, edge computing locations, and the like to monitor deployments. In other embodiments, the method 800 access the deployments through vendors of firmware, drivers, and software.

The method 800 monitors 804 websites and/or databases associated with firmware, drivers and/or software deployed on the plurality of servers for updates to the firmware, drivers and/or software. Often, vendors of firmware, drivers and/or software have a website where updates are available. In addition, other websites may either list updates or may influence updates. In the embodiments, the method 800 may monitor 804 standards organizations governing hardware and software standards that may affect firmware, drivers, and software deployed on the servers. In the embodiments, the method 800 may monitor 804 error logs, a version control system, a software workspace collaboration tool where updates and/or information about updates are posted.

The method 800 analyzes 806 information from monitoring the firmware, drivers and/or software deployments and updates from the websites and/or databases and manages 808 recommended deviations from recommended setups in response to analysis of the information, and the method 800 ends. In some embodiments, the method 800 is implemented using machine learning for analysis 806 and management 808 of recommended deviations. In various embodiments, all or a portion of the method 800 is implemented with the deployment tracking module 314 with a deployment monitoring module 402, a website/database monitoring module 404, the analysis module 406, the deviation management module 408, and/or the machine learning engine 506.

Figure 9:
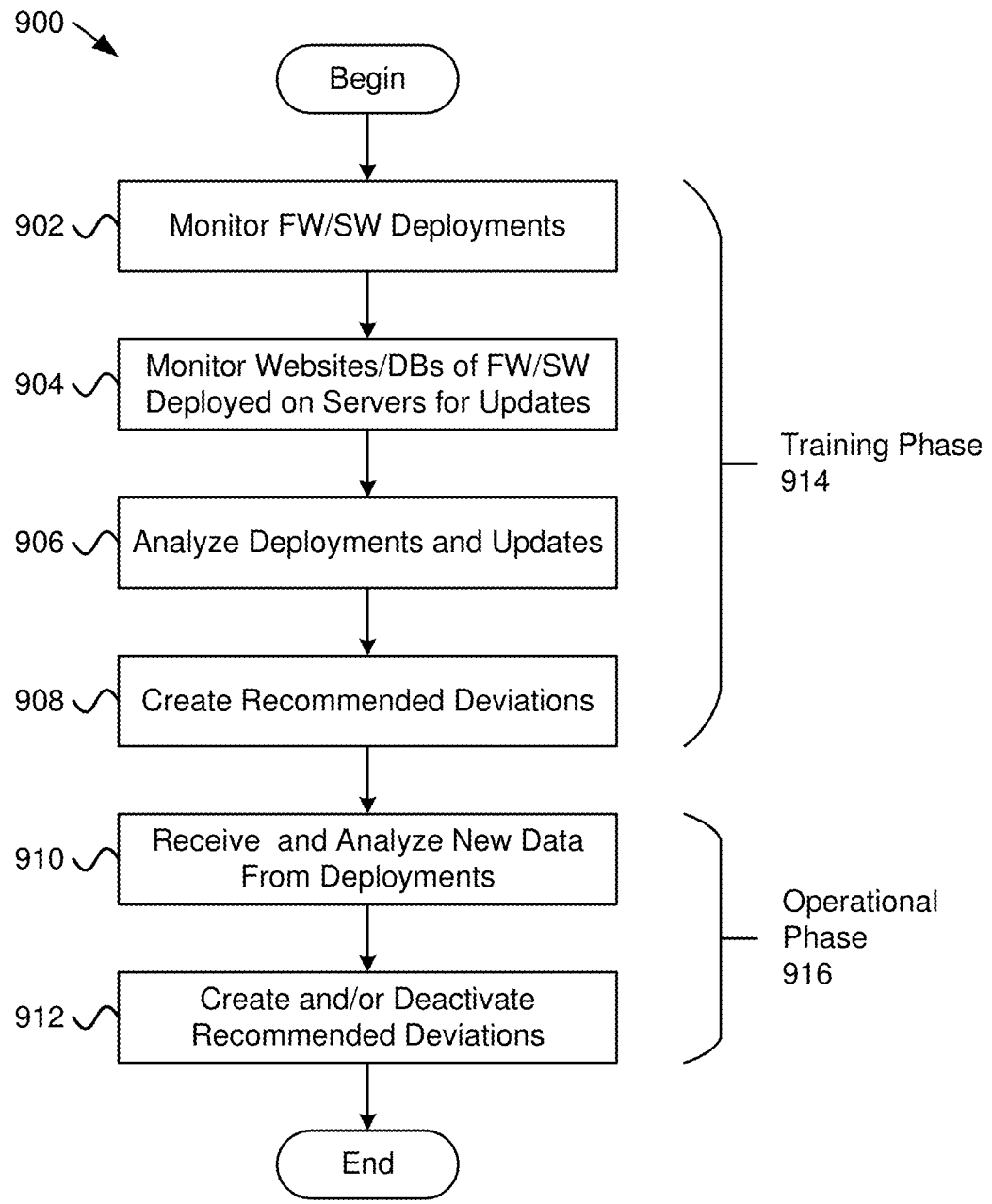
FIG. 9 is a schematic flow chart diagram illustrating another method for managing recommended deviations to a recommended setup, according to various embodiments.

FIG. 9 is a schematic flow chart diagram illustrating another method 900 for managing recommended deviations to a recommended setup, according to various embodiments. The method 900 begins and, during a training phase 912 of a machine learning algorithm, monitors 902 firmware, drivers and/or software deployments of a plurality of servers and associated configuration information for problems associated with the firmware, drivers and/or software deployments and monitors 904 websites and/or databases associated with firmware, drivers and/or software deployed on the plurality of servers for updates to the firmware, drivers and/or software. Also during the training phase 912 of a machine learning algorithm, the method 900 analyzes 906 information from monitoring the firmware, drivers and/or software deployments and updates from the websites and/or databases and manages 908 recommended deviations from recommended setups in response to analysis of the information.

The method 900, during an operational phase 916 of the machine learning algorithm, receives and analyzes 910 additional data from server deployments and/or websites and/or databases associated with firmware, drivers, and software deployed on the servers and creates and/or deactivates 912 recommended deviations, and the method 900 ends. In various embodiments, all or a portion of the method 800 is implemented with the deployment tracking module 314 with a deployment monitoring module 402, a website/database monitoring module 404, the analysis module 406, the deviation management module 408, the training module 502, the update module 504, and/or the machine learning engine 506.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   identifying, at a management server, configuration information of a server being deployed, the configuration information comprising a configuration and software requirements for the server, the server managed by the management server through a management controller controlling a host computing device hosting the server;
   retrieving a recommended setup of hardware and software for the server based on the configuration information;
   retrieving, from a deployment tracking module, a recommended deviation to the recommended setup;
   creating a deployment file based on the recommended setup and recommended deviation; and
   transmitting the deployment file to the management controller, wherein the management controller uses the deployment file to configure the server,
   wherein the deployment tracking module is configured to:
      monitor firmware, drivers and/software deployments of a plurality of servers and associated configuration information for problems associated with the firmware, drivers and/or software deployments;
      monitor websites and/or databases associated with firmware, drivers and/or software deployed on the plurality of servers for updates to the firmware, drivers and/or software;
      analyze information from monitoring the firmware, drivers and/or software deployments and updates from the websites and/or databases; and
      manage recommended deviations from recommended setups in response to analysis of the information.

2. The method of claim 1, further comprising transmitting to a user an approval request for the recommended deviation in response to retrieving the recommended deviation, and wherein transmitting the deployment file is in response to receiving an approval of the approval request.

3. The method of claim 1, further comprising, during a training phase, using a machine learning algorithm to analyze the information from the monitoring of the firmware, drivers and/or software deployments and the updates from the websites and/or databases and to create the deployment file.

4. The method of claim 3, further comprising, during an operational phase after the training phase and after creation and execution of one or more deployment files, using the machine learning algorithm to analyze additional information from the monitoring of the firmware, drivers and/or software deployments and/or additional updates from the websites and/or databases to create additional deployment files and/or to deactivate deployment files.

5. The method of claim 1, wherein the deployment tracking module managing recommended deviations comprises deactivating a recommended deviation in response to one or more problems associated with installation of the recommended deviation and/or creating a recommended deviation in response to a successful deployment of a deviation to a recommended setup on a server.

6. The method of claim 1, wherein the deployment tracking module managing recommended deviations comprises creating a recommended deviation based on user modifications to a recommended setup.

7. The method of claim 1, wherein retrieving the recommended deviation from the deployment tracking module is based on a specific configuration of the server being deployed and/or a specific use case of the software requirements for the server.

8. The method of claim 1, wherein the websites and/or databases associated with firmware, drivers and/or software comprise a website and/or database of:
a vendor of hardware and/or software of the recommended setup and/or recommended deviation;
a vendor of the plurality of servers;
a standards organization governing standards for the host computing device and/or software deployed on the server;
an error log;
a version control system; and/or
a software workspace collaboration tool.

9. The method of claim 1, wherein the host computing device comprises a hypervisor and the server is on the hypervisor or is a virtual machine hosted by the hypervisor.

10. The method of claim 1, wherein the management server is connected to the management controller over a management network.

11. The method of claim 1, wherein the deployment file comprises an ISO image file.

12. An apparatus comprising:
a processor; and
non-transitory computer readable storage media storing code, the code being executable by the processor to perform operations comprising:
identifying, at a management server, configuration information of a server being deployed, the configuration information comprising a configuration and software requirements for the server, the server managed by the management server through a management controller controlling a host computing device hosting the server;
retrieving a recommended setup of hardware and software for the server based on the configuration information;
retrieving, from a deployment tracking module, a recommended deviation to the recommended setup;
creating a deployment file based on the recommended setup and recommended deviation; and
transmitting the deployment file to the management controller, wherein the management controller uses the deployment file to configure the server,
wherein the deployment tracking module is configured to:
monitor firmware, drivers and/or software deployments of a plurality of servers and associated configuration information for problems associated with the firmware, drivers and/or software deployments;
monitor websites and/or databases associated with firmware, drivers and/or software deployed on the plurality of servers for updates to the firmware, drivers and/or software;
analyze information from monitoring the firmware, drivers and/or software deployments and updates from the websites and/or databases; and
manage recommended deviations from recommended setups in response to analysis of the information.

13. The apparatus of claim 12, the operations further comprising transmitting to a user an approval request for the recommended deviation in response to retrieving the recommended deviation, and wherein transmitting the deployment file is in response to receiving an approval of the approval request.

14. The apparatus of claim 12, the operations further comprising, during a training phase, using a machine learning algorithm to analyze the information from the monitoring of the firmware, drivers and/or software deployments and the updates from the websites and/or databases and to create the deployment file.

15. The apparatus of claim 14, the operations further comprising, during an operational phase after the training phase and after creation and execution of one or more deployment files, using the machine learning algorithm to analyze additional information from the monitoring of the firmware, drivers and/or software deployments and/or additional updates from the websites and/or databases to create additional deployment files and/or to deactivate deployment files.

16. The apparatus of claim 12, wherein the deployment tracking module managing recommended deviations comprises:
deactivating a recommended deviation in response to one or more problems associated with installation of the recommended deviation;
creating a recommended deviation in response to a successful deployment of a deviation to a recommended setup on a server; and/or
creating a recommended deviation based on user modifications to a recommended setup.

17. The apparatus of claim 12, wherein retrieving the recommended deviation from the deployment tracking module is based on a specific configuration of the server being deployed and/or a specific use case of the software requirements for the server.

18. The apparatus of claim 12, wherein the websites and/or databases associated with firmware, drivers and/or software comprise a website and/or database of:

a vendor of hardware and/or software of the recommended setup and/or recommended deviation;
a vendor of the plurality of servers;
a standards organization governing standards for the host computing device and/or software deployed on the server;
an error log;
a version control system; and/or
a software workspace collaboration tool.

19. A program product comprising a non-transitory computer readable storage medium storing code, the code being configured to be executable by a processor to perform operations comprising:
   identifying, at a management server, configuration information of a server being deployed, the configuration information comprising a configuration and software requirements for the server, the server managed by the management server through a management controller controlling a host computing device hosting the server;
   retrieving a recommended setup of hardware and software for the server based on the configuration information;
   retrieving, from a deployment tracking module, a recommended deviation to the recommended setup;
   creating a deployment file based on the recommended setup and recommended deviation; and
   transmitting the deployment file to the management controller, wherein the management controller uses the deployment file to configure the server,
   wherein the deployment tracking module is configured to:
      monitor firmware, drivers and/or software deployments of a plurality of servers and associated configuration information for problems associated with the firmware, drivers and/or software deployments;
      monitor websites and/or databases associated with firmware, drivers and/or software deployed on the plurality of servers for updates to the firmware, drivers and/or software;
      analyze information from monitoring the firmware, drivers and/or software deployments and updates from the websites and/or databases; and
      manage recommended deviations from recommended setups in response to analysis of the information.

20. The program product of claim 19, the operations further comprising transmitting to a user an approval request for the recommended deviation in response to retrieving the recommended deviation, and wherein transmitting the deployment file is in response to receiving an approval of the approval request.

* * * * *